(12) United States Patent
Yen et al.

(10) Patent No.: US 6,745,255 B2
(45) Date of Patent: Jun. 1, 2004

(54) SMALL MEMORY DEVICE WITH DRIVERS ON DEVICE

(75) Inventors: An-Yu Yen, Hsinchu (TW); Tzong-Yu Wang, Hsinchu (TW); Fu-Chi Chuang, Hsinchu (TW); Chia-Ling Chang, Hsinchu (TW)

(73) Assignee: W-Link Systems Inc., Hsinchu (TW)

( * ) Notice: Subject to any disclaimer, the term of this patent is extended or adjusted under 35 U.S.C. 154(b) by 128 days.

(21) Appl. No.: 10/141,062

(22) Filed: May 9, 2002

(65) Prior Publication Data
US 2003/0212838 A1 Nov. 13, 2003

(51) Int. Cl.⁷ .......................... G06F 13/14; G06F 13/16
(52) U.S. Cl. ........................ 710/13; 710/8; 710/10; 709/217; 709/321; 709/327
(58) Field of Search ................ 710/13, 8, 10; 713/1; 709/217, 321, 327

(56) References Cited

U.S. PATENT DOCUMENTS 6,249,863 B1 * 6/2001 Redford et al. ................ 713/1
6,424,424 B1 * 7/2002 Lomas et al. ............... 358/1.14
6,434,403 B1 * 8/2002 Ausems et al. ............ 455/556.2
6,487,608 B2 * 11/2002 Gifford et al. .................. 710/8
6,567,860 B1 * 5/2003 Maxwell et al. ............ 709/327
6,606,669 B1 * 8/2003 Nakagiri ..................... 709/327

* cited by examiner

Primary Examiner—Rehana Perveen
(74) Attorney, Agent, or Firm—Rosenberg, Klein & Lee

(57) ABSTRACT

The present invention provides a small memory device with drivers on device, which comprises a memory and a bluetooth transceiver module or a wireless transceiver module (e.g., IEEE 802.11b). In addition to common memory function, the memory can have a bluetooth drivervon device so that the bluetooth transceiver module can perform short-distance wireless transmission. The bluetooth transceiver module can thus transmit the data in the memory or receive information into the memory for storage. Besides, other common drivers can be inbuilt in the memory so that a computer system can automatically detect and install the drivers. The user needs not to take CD-ROM disks or floppy disks along with him for installation. The present invention provides a portable memory having the effects of short-distance wireless transmission, plug-and-play, and high portability.

6 Claims, 3 Drawing Sheets

SMALL MEMORY DEVICE WITH DRIVERS ON DEVICE

FIELD OF THE INVENTION

The present invention relates to a memory device and, more particularly, to a small memory device with drivers on device.

BACKGROUND OF THE INVENTION

Along with continual development of the information industry, various kinds of electronic information products such as mobile phones, notebook computers, personal digital assistants (PDAs), and digital cameras provide different applications like multimedia entertainments and network transmission of data in everyday life. Usually, it is necessary for these portable electronic products to store various kinds of electronic data. Therefore, data storages (memories) play a very important role.

However, there are many different memory devices used in existent electronic products, like compact flash (CF) cards, secured digital (SD) cards, memory devices of PCMCIA interface, and memory devices of USB interface. Memories for different applications in the prior art are matched and installed on computer systems to meet the requirements thereof. When one wants to transmit data to an external device, an external cable must be used to achieve interconnection. If several kinds of electronic products are simultaneously used with a personal computer, there will be many entangled electric cables, resulting in very cumbersome use.

Manufacturers have developed out adaptors capable of plugging with different memory cards for portable memories so that a user can change different memories to perform transmission of data. Although the user needs not additionally purchase an external cable for data transmission, he needs to purchase a memory card adaptor and perform the actions of plugging and changing cards.

Besides, along with continual progress of computer peripherals such as mice, network cards, printers, and scanners, memories for different applications have respective drivers. Therefore, the kinds of drivers become more and more. When a user starts using different computer peripherals, it is usually necessary to take along CD-ROM disks or floppy disks so as to install drivers into a computer system. Once the personal computer crashes and the drivers needs to be reinstalled, it is necessary to use again the CD-ROM disks or floppy disks provided by the manufacturer, resulting in inconvenient storage and use for the user.

Accordingly, the present invention aims to propose a small memory device with drivers on device, which integrates the bluetooth wireless transmission technique to resolve the above problems in the prior art.

SUMMARY OF THE INVENTION

The primary object of the present invention is to provide a small memory device integrating the wireless transmission technique (the bluetooth wireless network) so that an external cable is not required when transmitting data.

Another object of the present invention is to provide a portable wireless transmission memory, which is plug-and-play. It is not necessary to take out the memory and insert it to a computer system when transmitting data to the computer system.

Yet another object of the present invention is to provide a small memory device with drivers on device, whereby a user needs not to additionally take CD-ROM disks or floppy disks along with him, and a computer system can automatically detect and install the drivers.

According to the present invention, a bluetooth or a wireless transceiver module is installed in a small memory device, and drivers of the bluetooth or wireless transceiver module are inbuilt on the memory. Other common drivers can also be inbuilt in the memory.

The various objects and advantages of the present invention will be more readily understood from the following detailed description when read in conjunction with the appended drawing, in which:

DETAILED DESCRIPTION OF THE PREFERRED EMBODIMENTS

In the present invention, a small memory device integrating the wireless transmission technique is exploited. In addition to common memory function, the memory can also have drivers of bluetooth on device. An inbuilt bluetooth transceiver module or an inbuilt wireless transceiver module lets a portable memory achieve real-time transmission of data.

Figure 1:
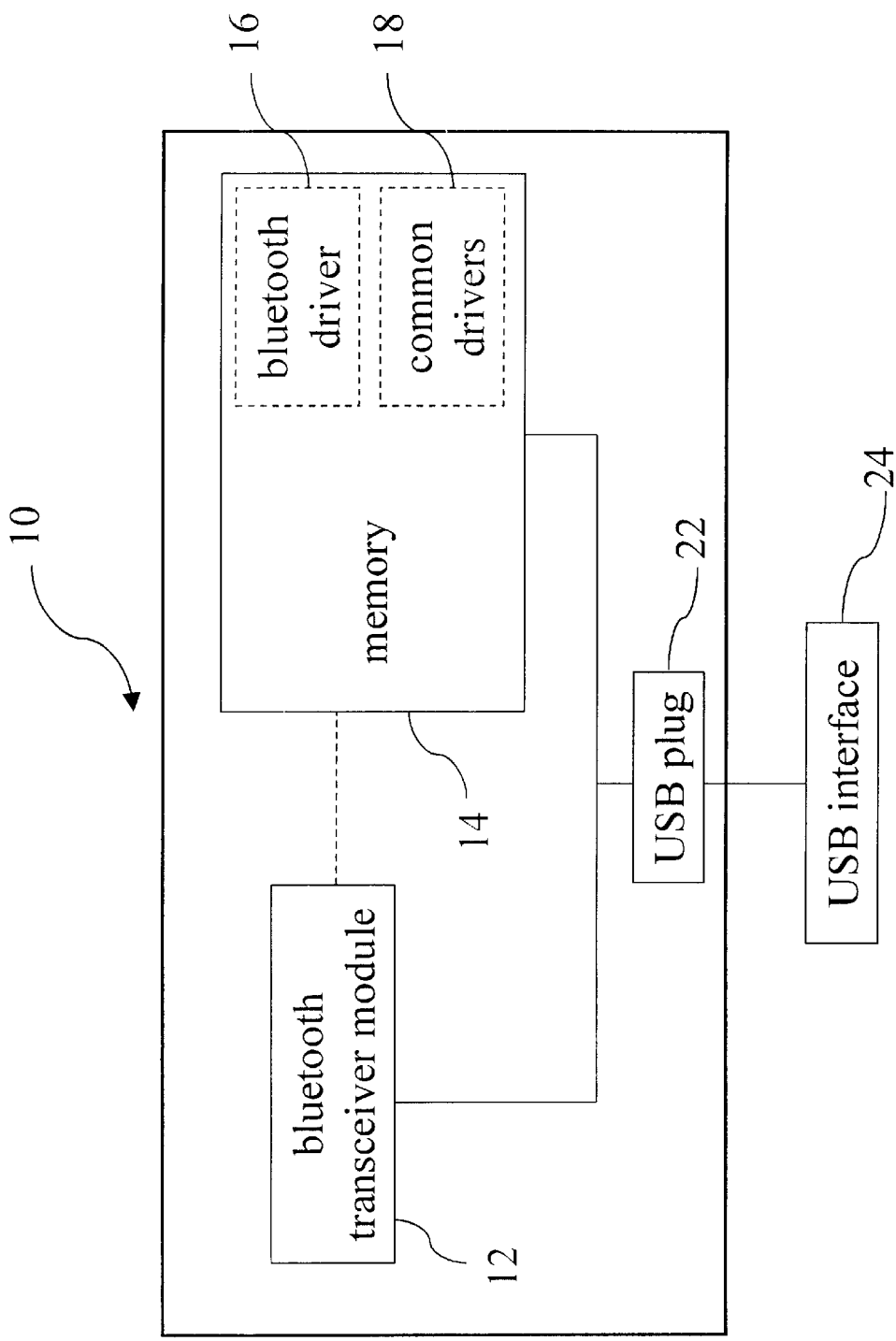
FIG. 1 is a diagram of a first embodiment of the present invention.

As shown in FIG. 1, a small memory 10 is a USB device, which is divided into two parts one being a bluetooth transceiver module 12, the other being a memory 14. Two blocks are provided in the memory 14 for storage of drivers including a bluetooth driver 16 and other common drivers 18. The small memory device has a USB plug 22, which can be connected to a USB interface 24. In addition to applying to USB devices, the above small memory device can also apply to various kinds of memories like PCMCIA cards, CF cards, and SD cards.

When data transmission is performed for the first time, the above small memory device 10 can automatically detect whether the computer system has the bluetooth driver. If there is no driver, the bluetooth driver 16 stored in the memory 14 is performed automatically so that the bluetooth transceiver module can accomplish short-distance wireless transmission. The bluetooth transceiver module 12 is responsible for sending the data in the memory 14 out or receiving external information into the memory 14 for storage.

The memory 14 provides a large quantity of storage space for storing various kinds of electronic data so that the user can conveniently read out, edit, delete, or transmit data in the memory 14 to other personal computers. In addition to common memory function, the small memory device 14 proposed in the present invention can also have a plurality of common drivers 18 on device. When installing software, a computer system can automatically detect and install the driver thereinto. Therefore, using the above small memory device can simultaneously install the required drivers without the need of taking along CD-ROM disks or floppy disks, thereby achieving very convenient storage and use.

Figure 2:
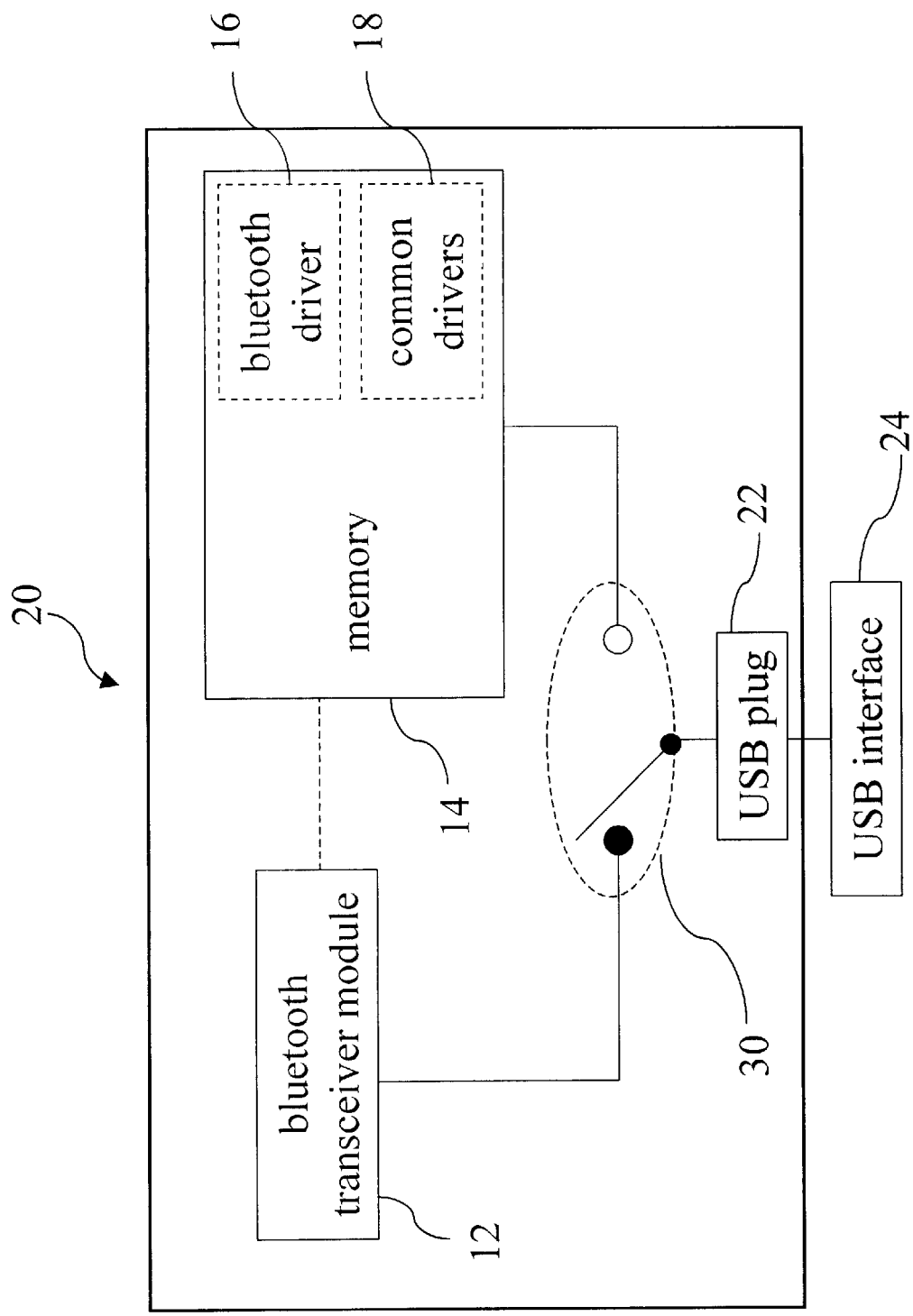
FIG. 2 is a diagram of another embodiment of the present invention.

As shown in FIG. 2, the structure and function of a small memory device 20 are the same as those of the small memory device 10 in the first embodiment. The small memory device 20 also has the bluetooth transceiver-module 12 and the memory 14. The memory 14 has two small blocks for storage of the bluetooth driver 16 and a plurality of common drivers 18. The different is that a switch 30 is also provided. The switch 30 is connected between the drivers in the above memory 14 and the bluetooth transceiver module 12 for manual installation of driver. When the switch 30 is switched to the memory 14, the computer system will automatically perform the driver.

Figure 3:
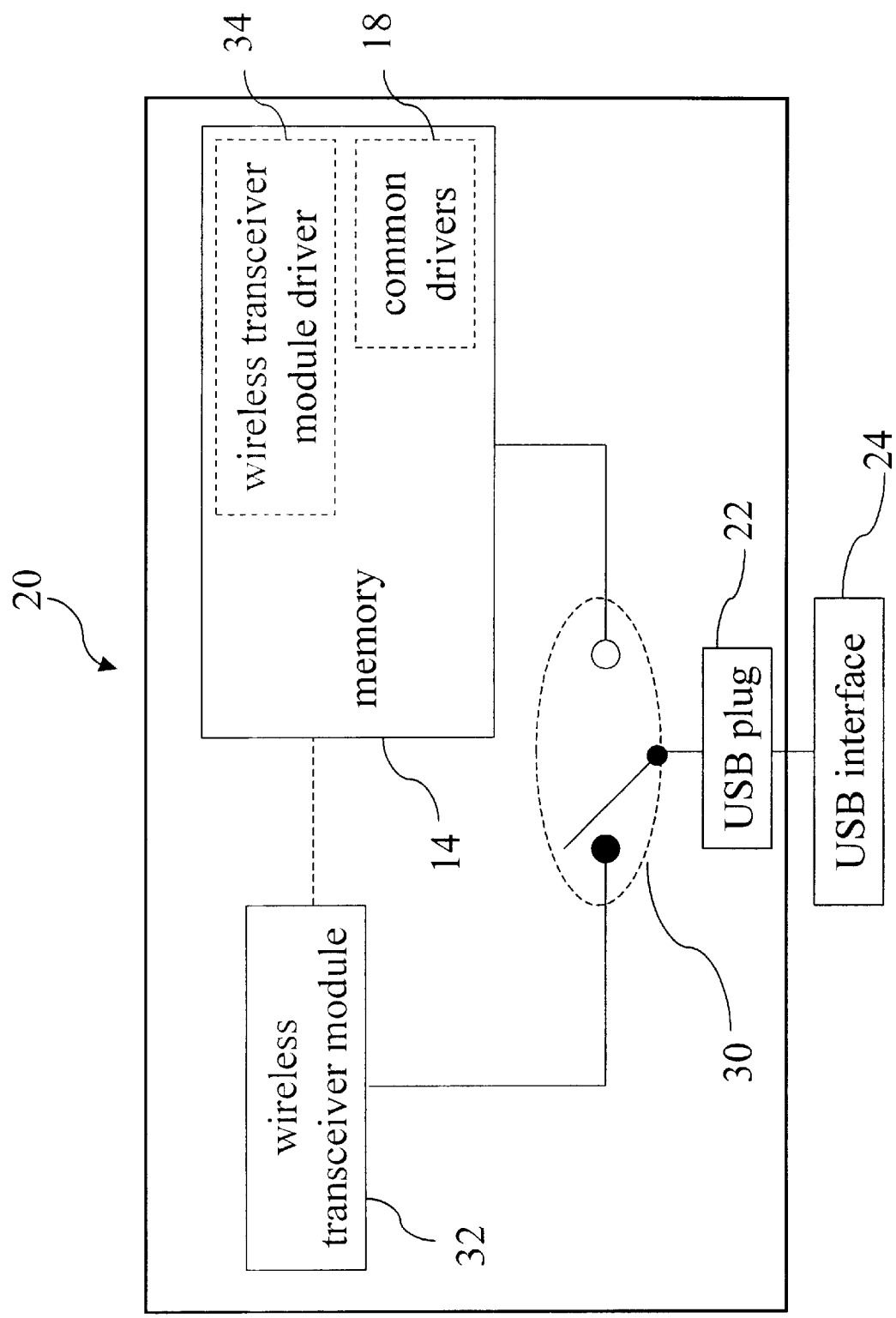
FIG. 3 is a diagram of yet another embodiment of the present invention.

The bluetooth transceiver module in the above small memory device can be replaced with a common wireless transceiver module. As shown in FIG. 3, a wireless transceiver module 32 and a wireless transceiver module driver 34 replace the above bluetooth transceiver module and the driver thereof. The functional principle is the same as that in FIG. 1 or FIG. 2 and thus will not be further described.

To sum up, the wireless transmission technique is integrated in the above small memory device, and the bluetooth driver or the wireless network driver is directly stored in the memory. In addition to common memory function, wireless transmission of the information in portable memories used in various kinds of communications articles can be performed via the inbuilt bluetooth transceiver module or wireless transceiver module. Therefore, the present invention can effectively solve drawbacks and inconvenience in the prior art. Moreover, common drivers can be inbuilt in the memory device so that a user needs not to additionally take CD-ROM disks or floppy disks along with him for installation, resulting in very convenient storage and use.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A small memory device with drivers on device, comprising:

a memory for storage of electronic data;

a wireless transceiver module for transmitting data in said memory or receiving external information into said memory for storage; and a plurality of drivers built-in to said memory so that a computer system can automatically detect and install said drivers, one of said drivers being a driver of said wireless transceiver module.

2. A small memory device with drivers on device, comprising:

a memory for storage of electronic data;

a bluetooth transceiver module for transmitting data in said memory or receiving external information into said memory for storage; and a plurality of drivers built-in to said memory so that a computer system can automatically detect and install said drivers, one of said drivers being a driver of said bluetooth transceiver module.

3. A small memory device with drivers on device, comprising:

a memory for storage of electronic data;

a wireless transceiver module for transmitting data in said memory or receiving external information into said memory for storage;

a plurality of drivers built-in to said memory so that a computer system can automatically detect and install said drivers; and a switch connected between said drivers in said memory and said wireless transceiver module for manual installation of driver, the computer system detecting said driver to perform installation when said switch is switched to said memory.

4. The small memory device with drivers on device as claimed in claim 3, wherein said wireless transceiver module is a bluetooth transceiver module.

5. The small memory device with drivers on device as claimed in claim 3, wherein one of said drivers is a driver of said wireless transceiver module.

6. The small memory device with drivers on device as claimed in claim 4, wherein one of said drivers is a driver of said bluetooth transceiver module.

* * * * *